US011172529B2

(12) United States Patent
Liu et al.

(10) Patent No.: US 11,172,529 B2
(45) Date of Patent: Nov. 9, 2021

(54) MULTI-CONNECTIVITY ESTABLISHMENT METHOD, COMMUNICATION SYSTEM, USER EQUIPMENT AND ACCESS POINT

(71) Applicant: NOKIA SOLUTIONS AND NETWORKS SYSTEM TECHNOLOGY (BEIJING) CO., LTD., Beijing (CN)

(72) Inventors: Yang Liu, Beijing (CN); Lei Du, Beijing (CN); Ingo Viering, Munich (DE); Jarmo Tapani Makinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/474,343

(22) PCT Filed: Dec. 27, 2016

(86) PCT No.: PCT/CN2016/112314
§ 371 (c)(1),
(2) Date: Jun. 27, 2019

(87) PCT Pub. No.: WO2018/119636
PCT Pub. Date: Jul. 5, 2018

(65) Prior Publication Data
US 2019/0350026 A1    Nov. 14, 2019

(51) Int. Cl.
*H04W 76/15*    (2018.01)
*H04W 84/04*    (2009.01)
*H04W 92/10*    (2009.01)

(52) U.S. Cl.
CPC .......... *H04W 76/15* (2018.02); *H04W 84/045* (2013.01); *H04W 92/10* (2013.01)

(58) Field of Classification Search
CPC ..... H04W 48/20; H04W 76/12; H04W 76/15; H04W 92/10; H04W 84/045
See application file for complete search history.

(56) References Cited

U.S. PATENT DOCUMENTS

2015/0208235 A1    7/2015  Ingale et al.
2015/0319748 A1*  11/2015  Huang ................. H04W 24/08
                                                        370/329
(Continued)

FOREIGN PATENT DOCUMENTS

CN    101998664 A    3/2011
CN    102469557 A    5/2012
(Continued)

OTHER PUBLICATIONS

Extended European Search Report dated Jul. 3, 2020 corresponding to European Patent Application No. 16925156.8.
(Continued)

*Primary Examiner* — Kevin C. Harper
*Assistant Examiner* — Derrick V Rose
(74) *Attorney, Agent, or Firm* — Squire Patton Boggs (US) LLP

(57) ABSTRACT

The present invention provides a multi-connectivity establishment method, communication system, user equipment (UE) and access point (AP), the method comprising: a UE setting up a first RRC connection with a CN node via a first AP; the UE, when the first AP transmits to the UE a notification that RAN anchoring function is supported by the first AP and the UE determines to use a second AP to set up a second RRC connection, transmitting a second connection request message to the second AP, wherein, the second connection request message including identifying information of the first AP; and the second AP, according to the second connection request message, transmitting an anchoring request message to the first AP so as to obtain UE context (Continued)

information, and setting up the second RRC connection with the UE according to the UE context information.

15 Claims, 5 Drawing Sheets

(56) References Cited

U.S. PATENT DOCUMENTS

2016/0242080 A1* 8/2016 Vikberg ............ H04W 36/0027
2018/0343659 A1* 11/2018 Hahn .................. H04W 56/001

FOREIGN PATENT DOCUMENTS

| CN | 102802220 A | 11/2012 |
| CN | 106031237 A | 10/2016 |
| GN | 104982088 A | 10/2015 |
| GN | 106162732 A | 11/2016 |
| WO | WO 2015/019172 A2 | 2/2015 |
| WO | 2016/045625 A3 | 3/2016 |
| WO | WO 2016/056075 A1 | 4/2016 |
| WO | 2016/130061 A1 | 8/2016 |

OTHER PUBLICATIONS

International Search Report and Written Opinion dated Sep. 27, 2017 corresponding to International Patent Application No. PCT/CN2016/112314.
Chinese Office Action corresponding to CN Application No. 201680092074.X, dated Jan. 6, 2021.

* cited by examiner

MULTI-CONNECTIVITY ESTABLISHMENT METHOD, COMMUNICATION SYSTEM, USER EQUIPMENT AND ACCESS POINT

FIELD

The present invention relates to the technical field of communication, and particular to a multi-connectivity establishment method, communication system, user equipment and access point.

BACKGROUND

As technology of communication continues to advance, 5G has become a focus of research on the technology of wireless communication. In order to improve mobility robustness (i.e. reliability/latency) and throughput, establishment of multi-connectivity has become a hot topic in 5G, wherein a UE is connected to multiple eNBs, as shown in FIG. 1. For example, when a UE sets up two RRC connections with two eNBs (for example, MeNB and SeNB in FIG. 1) at the same time, according to current specifications, the establishment of each of the RRC connections requires the interaction between each eNB and a core network (CN) node (for example, MME in FIG. 1).

Referring to FIG. 2, an example procedure of establishment of an RRC connection between a UE and a Mobility Management Entity (MME, which is an example of CN) via an eNB is described. As shown in FIG. 2, the procedure includes a first stage of interaction between the UE and the eNB (S201 through S203), a second stage of interaction between the eNB and the MME (S204 through S206), and a third stage of interaction between the UE and the eNB (S207 through S210). During the first stage, at S201, the UE transmits an RRCConnectionRequest message to the eNB, at S202, the eNB transmits an RRCConneaionSetup message to the UE, and at S203, the UE transmits an RRCConnectionSetupComplete message to the eNB. After the steps above, network side will trigger initial UE message to MME which will result in the involvement of UE context setup as well as core network authentication procedure, which will be described during the second stage and the third stage below. During the second stage, at S204, the eNB transmits an InitialUE message to the MME, at S205, the MME transmits an InitialContextSetupRequest message to the eNB, and at S206, the eNB transmits an InitialContextSetupResponse message to the MME. During the third stage, at S207, the eNB transmits a SecurityModeCommand message to the UE, at S208, the UE transmits a SecurityModeComplete message to the eNB, at S209, the eNB transmits an RRCConnectionReconfiguration message to the UE, and at S210, the UE transmits an RRCConnectionReconfigurationComplete message to the eNB. According to prior art, for 5G multi-connectivity case, when UE is setting up a second, third or more RRC connections with new eNBs, for each RRC connection among the RRC connections to be set up, it's required that the above steps of S201 through S210 are repeated. In this case, especially regarding steps S204 through S206, there are unneglectable interactions between each new eNB and the MME, and the CN needs to maintain two or more RRC connections and control plane interfaces (e.g., interfaces S1-C) for the same UE in parallel, which raises the complexity for CN management and implementation and increases the CN burden for 5G.

Therefore, the present disclosure provides a method and system which reduces CN burden during the establishment of multi-connectivity.

SUMMARY

In view of this, the present invention provides a multi-connectivity establishment method, communication system, user equipment and access point with improved mobility robustness and decreased CN burden.

According to an aspect of the present invention, the present invention provides a multi-connectivity establishment method for a communication system, the method comprising: a user equipment (UE) setting up a first radio resource control (RRC) connection with a core network (CN) node via a first access point (AP); the UE, when the first AP transmits to the UE a notification that radio access network (RAN) anchoring function is supported by the first AP and the UE determines to use a second AP to set up a second RRC connection, transmitting a second connection request message to the second AP, wherein, the second connection request message including identifying information of the first AP; and the second AP, according to the second connection request message, transmitting an anchoring request message to the first AP so as to obtain UE context information, and setting up the second RRC connection with the UE according to the UE context information.

According to another aspect of the present invention, the present invention provides a multi-connectivity establishment method for a user equipment (UE), the method comprising: the UE setting up a first radio resource control (RRC) connection with a core network (CN) node via a first access point (AP); the UE, when the first AP transmits to the UE a notification that radio access network (RAN) anchoring function is supported by the first AP and the UE determines to use a second AP to set up a second RRC connection, transmitting to the second AP a second connection request message so that the second AP obtains UE context information from the first AP according to the second connection request message, wherein, the second connection request message including identifying information of the first AP; and the UE, setting up the second RRC connection with the second AP, after the second AP transmits a connection setup message to the UE according to the UE context information.

According to another aspect of the present invention, the present invention provides a multi-connectivity establishment method for an access point (AP), the method comprising: the AP enabling a user equipment (UE) to set up a first radio resource control (RRC) connection with a core network (CN) node; the AP transmitting to the UE a notification that the AP supports radio access network (RAN) anchoring function; the AP, when receiving an anchoring request message from a second AP, transmitting UE context information to the second AP according to the anchoring request message so that the second AP sets up a second RRC connection with the UE according to the UE context information.

According to another aspect of the present invention, the present invention provides a multi-connectivity communication system, the communication system comprising: a user equipment (UE) configured to set up a first radio resource control (RRC) connection with a core network (CN) node via a first access point (AP); the first AP configured to transmit to the UE a notification that RAN anchoring function is supported by the first AP; a second AP configured to, when receiving a second connection request message transmitted from the UE requesting for using the second AP to set up a second RRC connection, transmit an anchoring request message to the first AP, wherein, the second connection setup message including identifying information of the first AP. The first AP is further configured to transmit UE context information to the second AP, according to the anchoring request message, and the second AP is further configured to set up the second RRC connection with the UE according to the UE context information.

According to another aspect of the present invention, the present invention provides a user equipment (UE), and the UE has set up a first radio resource control (RRC) connection with a core network (CN) node via a first access point (AP). The UE comprising: a reception unit configured to receive from the first AP a notification that the first AP supports RAN anchoring function; a processing unit configured to determine whether to use a second AP to set up a second RRC connection; and a transmission unit configured to transmit a second connection request message to the second AP when it determines to use the second AP to set up the second RRC connection, wherein the second connection request message including identifying information of the first AP. The reception unit is further configured to, when the second AP obtains UE context information from the first AP according to the second connection request message, receive a connection setup message from the second AP, and the transmission unit is further configured to, when the reception unit receives the connection setup message from the second AP, transmit a connection complete message to the second AP.

According to another aspect of the present invention, the present invention provides an access point (AP), and the AP enables a user equipment (UE) to set up a first radio resource control (RRC) connection with a core network (CN) node. The AP comprising: a transmission unit configured to transmit to the UE an notification that RAN anchoring function is supported by the AP; a reception unit configured to, when the UE receives the notification and determines to use a second AP to set up a second RRC connection, receive an anchoring request message from the second AP. The transmission unit is further configured to transmit UE context information to the second AP according to the anchoring request message so that the second AP sets up the second RRC connection with the UE according to the UE context information.

In summary, based on the anchoring function of an AP, multi-connectivity can be established between a UE with other APs via the AP serving as an anchoring device, without performing redundant UE context setup as well as core network authentication procedures. In addition, the UE context information is obtained from the AP serving as an anchoring device during the multi-connectivity establishment, which will not be a big burden for a CN node and guarantees the safety of multi-connectivity at the same time.

Further scope of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Figure 1:
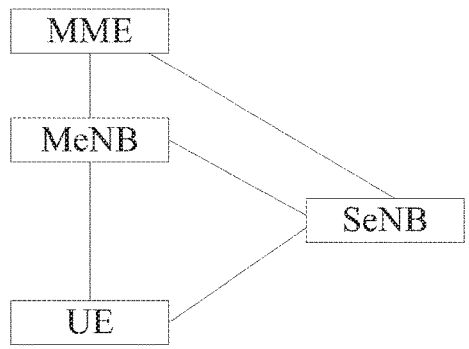
FIG. 1 illustrates a schematic diagram of establishment of multi-connectivity in prior art.

A multi-connectivity establishment method, a communication system, a user equipment, and an access point according to embodiments of the present invention will be described below with reference to the drawings. In the drawings, the same or similar reference signs represent the same or similar elements. It should be understood that the embodiments described herein are only illustrative and should not be construed as limitation to the scope of the invention.

According to an aspect of the present invention, a multi-connectivity establishment method for a communication system is provided, and illustrative embodiments of the multi-connectivity establishment method will be described in reference to FIGS. 3-5.

Figure 3:
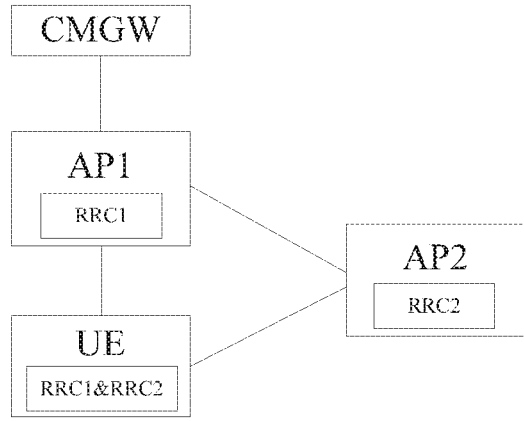
FIG. 3 illustrates a schematic architecture of a multi-connectivity communication system according to an embodiment of the invention.

FIG. 3 illustrates a schematic architecture of a multi-connectivity communication system according to an embodiment. In FIG. 3, a case where a UE sets up connections with two access network (AN) nodes is described as an example. It should be noted that throughout the specification, MME, CMGW (Control Manager Gateway) are taken as examples of a CN node, and MeNB, SeNB, and AP are described as examples of AN nodes. However, these examples in the specification are illustrative, which also include other CN nodes and AN nodes equivalent to these examples.

In the architecture of the communication system in FIG. 3, UE may set up a first RRC connection with the CN node (e.g., CMGW) via a first AP (which is also referred to as AP1). In addition, the UE may set up a second RRC connection with the CN node via a second AP (which is also referred to as AP2), namely, there are two RRC entities on the network side in the communication system. However, as described in the Background part, in the current multi-connectivity establishment method, a successful RRC connection setup procedure will trigger a transmission of an InitialUE message to a CN node, which may result in procedures such as UE context setup and core network authentication, as described in S204 through S210 with reference to FIG. 2. Therefore, a method of multi-connectivity establishment method with improved mobile robustness is provided in the present invention, wherein, based on the anchoring function of the first AP, the second AP is able to communicate with a CN node via the first AP, such that the CN side only maintains a single control plane interface (e.g., interface S1-C), which reduces CN burdens while guarantees mobility robustness. The multi-connectivity establishment method for a communication system will be described with reference to FIG. 4 below.

Figure 2:
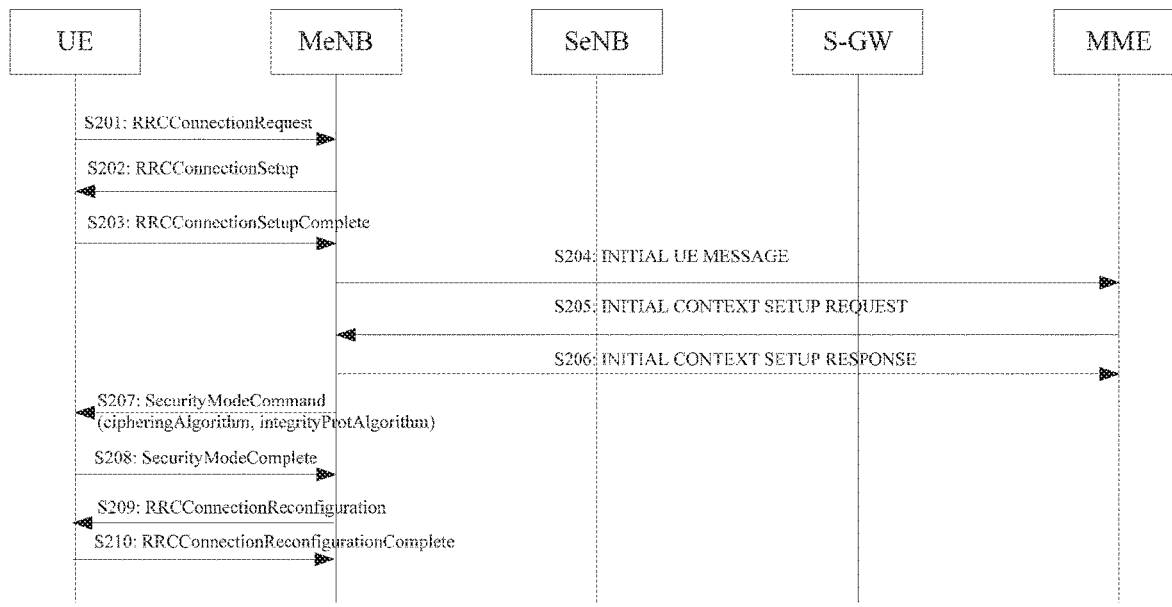
FIG. 2 illustrates a schematic diagram of an example procedure of establishment of an RRC connection.
Figure 4:
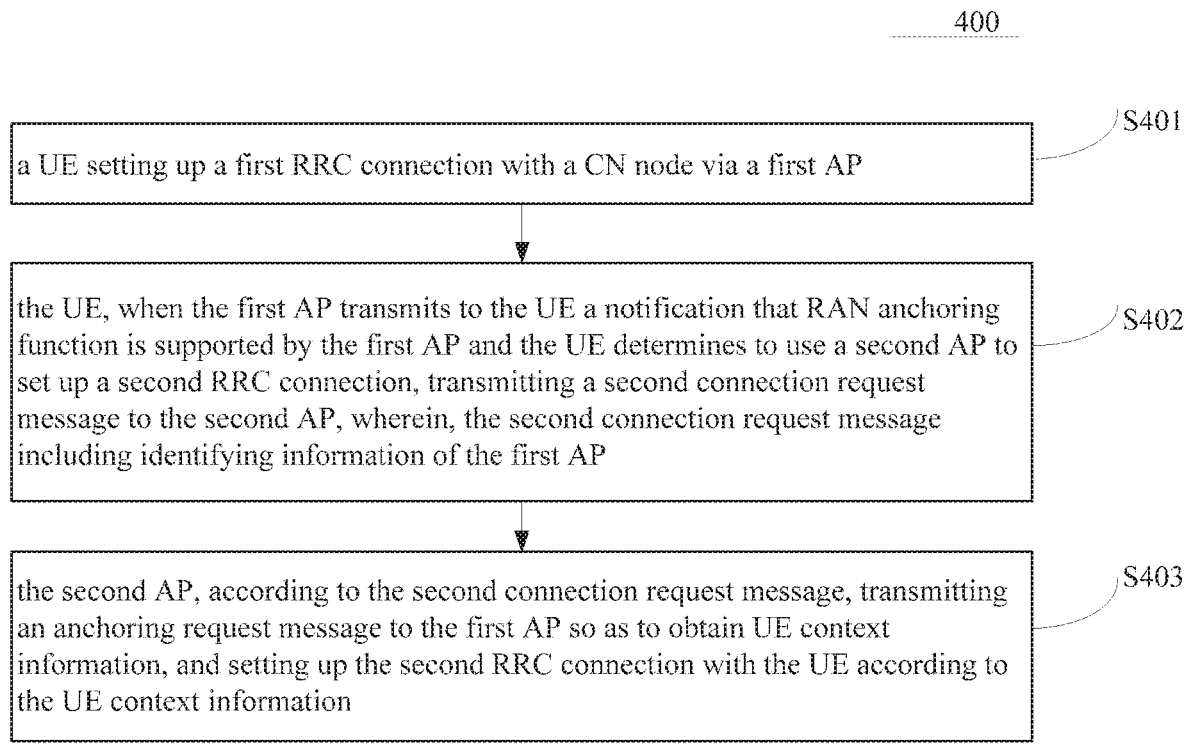
FIG. 4 illustrates a flowchart of a multi-connectivity establishment method for a communication system according to an embodiment of the invention.

FIG. 4 illustrates a flowchart of a multi-connectivity establishment method for a communication system according to an embodiment of the invention. As shown in FIG. 4, at S401, a UE sets up a first RRC connection with a CN node via a first AP. For example, a method as shown in FIG. 2 for establishing an RRC connection may be employed, so that the UE sets up the first RRC connection with the CN node.

At S402, the first AP transmits to the UE a notification that RAN anchoring function is supported by the first AP, and when the UE receives the notification and determines to use a second AP to set up a second RRC connection, the UE transmits a second connection request message to the second AP, wherein, the second connection request message including identifying information of the first AP. For example, the notification from the first AP to the UE may be transmitted via system information or dedicated RRC signaling procedure. For another example, the identifying information of the first AP included in the second RRC connection request message may be either the global cell identifier for the first AP, or physical layer cell identity associated with a frequency, or a global eNB identity. Further, the second connection request message optionally includes identifying information of the UE used in first AP, which may be, for example, cell radio network temporary identifier (C-RNTI), and S-temporary mobile subscriber identity (S-TMSI).

At S403, the second AP, according to the second connection request message, transmits an anchoring request message to the first AP so as to obtain UE context information, and the second AP then sets up the second RRC connection with the UE according to the UE context information. For example, the anchoring request message optionally includes identifying information of UE used in first AP which may be, for example, C-RNTI, S-TMSI. For another example, the UE context information may be obtained via an anchoring ACK message, which is transmitted to the second AP by the first AP according to the anchoring request message, and the UE context information is included therein. For yet another example, after the UE context information is obtained, the second AP may transmit a connection setup message to the UE according to the UE context information, and the UE may transmit a connection setup complete message to the second AP so as to set up the second RRC connection with the second AP according to the connection setup message.

Figure 5:
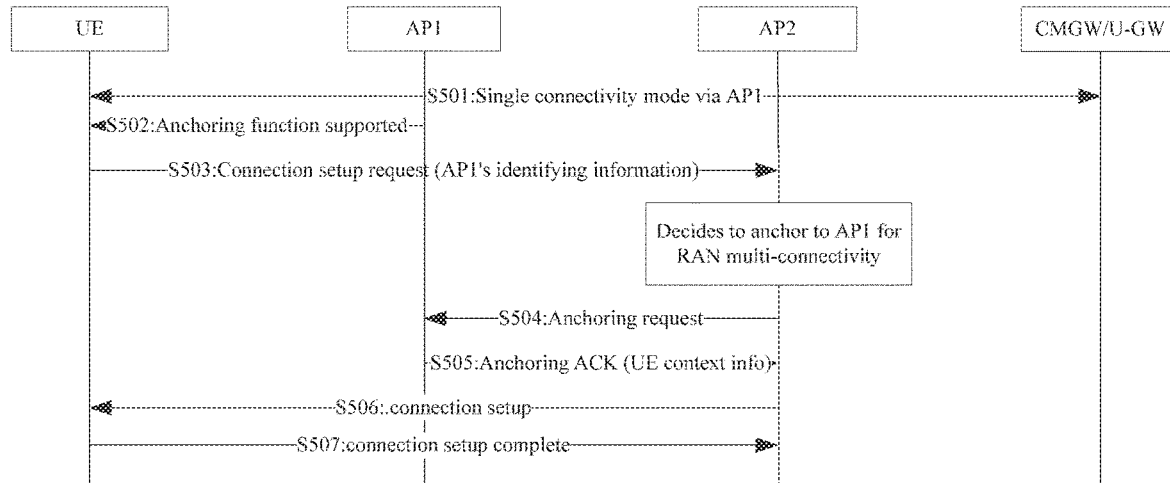
FIG. 5 illustrates a schematic diagram of a multi-connectivity establishment method for a communication system according to FIG. 4.

FIG. 5 illustrates a schematic diagram of a multi-connectivity establishment method described in reference to FIG. 4. As shown in FIG. 5, at S501, a UE sets up a first RRC connection with a CN node via a first AP. At S502, the first AP transmits to the UE a notification that RAN anchoring function is supported by the first AP. At S503, the UE determines to use a second AP to set up a second RRC connection, and transmits a second connection request message to the second AP, wherein, the second connection request message includes identifying information of the first AP. At S504, the second AP, according to the second connection request message, decides to anchor to first AP for RAN multi-connectivity, and transmits an anchoring request message to the first AP. At S505, the first AP, according to the anchoring request message, accepts the anchor request and transmits an anchoring ACK message to the second AP, wherein, the anchoring ACK message includes the UE context information. At S506, the second AP, according to the UE context information, transmits a connection setup message to the UE. At S507, the UE, according to the connection setup message, transmits a connection setup complete message to the second AP so as to set up the second RRC connection with the second AP.

According to an embodiment of the invention, after the two RRC connections with two APs (for example, AP1 and AP2 as shown in FIG. 3) have been established, the first AP will serve as anchoring device for multi-connectivity. That is to say, from UE perspective, data to be transmitted to a CN node through the first AP will be transmitted directly via the first AP, and data to be transmitted to a CN node through the second AP will be firstly transmitted from the second AP to the first AP, for example, via a X2 interface, and then transmitted to a CN node via the first AP, for example, via a S1 interface, thereby realizing multi-connectivity.

At this point, the procedure of establishment of connections between a UE and two AN nodes has accomplished, but it should be noted that, the multi-connectivity establishment method of the present invention is not limited to the connections between the UE and the two AN nodes. For example, according to the embodiments of the present invention, depending on implementations in practical, multi-connections to a CN node may be established between UE(s) and three or more APs via an AP serving as an anchoring device (for example, AP1 as described in FIG. 3-5 above).

According to an embodiment of the invention, after the RRC connection with an AP serving as an anchoring device is established, and when the UE receives a notification that anchoring function is supported by the AP and the UE determines to establish RRC connections with other APs, the UE is able to establish multi-connections with other APs via the AP serving as an anchoring device, without performing steps S204 through S210 as described in reference to FIG. 2, which may reduce the impact to CN for multi-connectivity.

In addition, after the RRC connections with the two APs (referring to the descriptions in reference to FIG. 3-5) are established, there is possibility that the RRC connections are disconnected, and in the following, a case where the second RRC connection with the second AP is disconnected and a case where the first RRC connection with the first AP is disconnected will be described according to other embodiments of the present invention.

According to another embodiment of the present invention, in a case where the second RRC connection with the second AP is disconnected, UE could then setup a third RRC connection with a third AP indicating that the anchoring device would be the first AP, and the third AP will obtain UE context information in such a way as the interactions between the second AP and the first AP during the second AP obtaining UE context information from the first AP, and it's not necessary to perform S204 through S210 for the third AP. For example, the procedure of multi-connectivity establishment for the third AP is as follows:

Firstly, when the second RRC connection with the second AP is disconnected and the UE determines to use a third AP to set up a third RRC connection, the UE transmits a third connection request message to the third AP, wherein, the third connection request message includes identifying information of the first AP.

Then, similarly as the interactions between the second AP and the first AP described in reference to FIG. 3-5, the third AP, according to the third connection request message, transmits an anchoring request message to the first AP so as to obtain the UE context information, and sets up the third RRC connection with the UE according to the UE context information.

According to the above embodiment, it's possible that the UE transmitting connection request messages to other APs even if the connection with the second AP is disconnected, and the first AP may be employed as an anchoring device, thereby guarantees the robustness of multi-connectivity.

According to yet another embodiment, in a case where the first RRC connection with first AP is disconnected, i.e. the connection with the anchoring device is disconnected, an AP (for example, AP2 as described in reference to FIG. 2-5) which has established an RRC with the UE and which is different from the AP serving as an anchoring device previously (for example, AP1 as described in reference to FIG. 2-5) may be employed as a new anchoring device. Similarly, as the way the first AP serving as an anchoring device as described in reference to FIG. 2-5, multi-connections may be established with other APs via the second AP serving as a new anchoring device. For example, the procedure of multi-connectivity establishment for a fourth AP is as follows:

Firstly, when the first RRC connection with the first AP is disconnected, the first AP transmits the UE context information to the second AP. Then, when receiving the UE context information, the second AP transmits to the UE a notification that the second AP serving as a new anchoring device, so that UE may establish multi-connections to the CN node with other APs via AP2 serving as an anchoring device, when the UE receives the notification and determines to establish multi-connections with other APs.

Then, when receiving the notification that the second AP serving as a new anchoring device and determining to use a fourth AP to setup a fourth RRC connection, the UE transmits a fourth connection setup message to the fourth AP, wherein, the fourth connection request message including identifying information of the second AP. Similarly, as the interactions between the second AP and the first AP described in reference to FIG. 3-5, the fourth AP, according to the fourth connection request message, transmits an anchoring request message to the second AP so as to obtain the UE context information, and sets up the fourth RRC connection with the UE according to the UE context information.

In the embodiments above, other APs with which the UE determines to set up an RRC connection may obtain UE context information from an AP serving as an anchoring device, instead of obtaining the UE context information from the CN side or from the UE side.

Compared with obtaining the UE context information from the CN side, since obtaining the UE context information from the CN side will result in InitialUE message to be transmitted to a CN node and will result in multi-connections for a single UE from CN perspective, and thus becomes a complicated architecture. In contrast, in the embodiments of the present invention, the UE context information is obtained from the AP serving as an anchoring device, which will not be a big burden for CN and will not cause significant impact to whole CN architecture. On the other hand, compared with obtaining the UE context information from the UE side, since UE is not in a trust security domain as the network equipment, especially UE context information contains lots of UE subscriber information related with charging, security, etc, thus obtaining the UE context information from the UE side is not safe. In contrast, in the embodiments of the present invention, the UE context information is obtained from the AP serving as an anchoring device, which is much safer.

In summary, in the present invention, the UE context information is obtained from an AP serving as an anchoring device during the multi-connectivity establishment, which will not be a big burden for CN node and guarantees the safety of multi-connectivity at the same time.

According to another aspect of the present invention, a multi-connectivity establishment method for a UE is provided, and illustrative embodiments of the multi-connectivity establishment method will be described in reference to FIG. 6.

Figure 6:
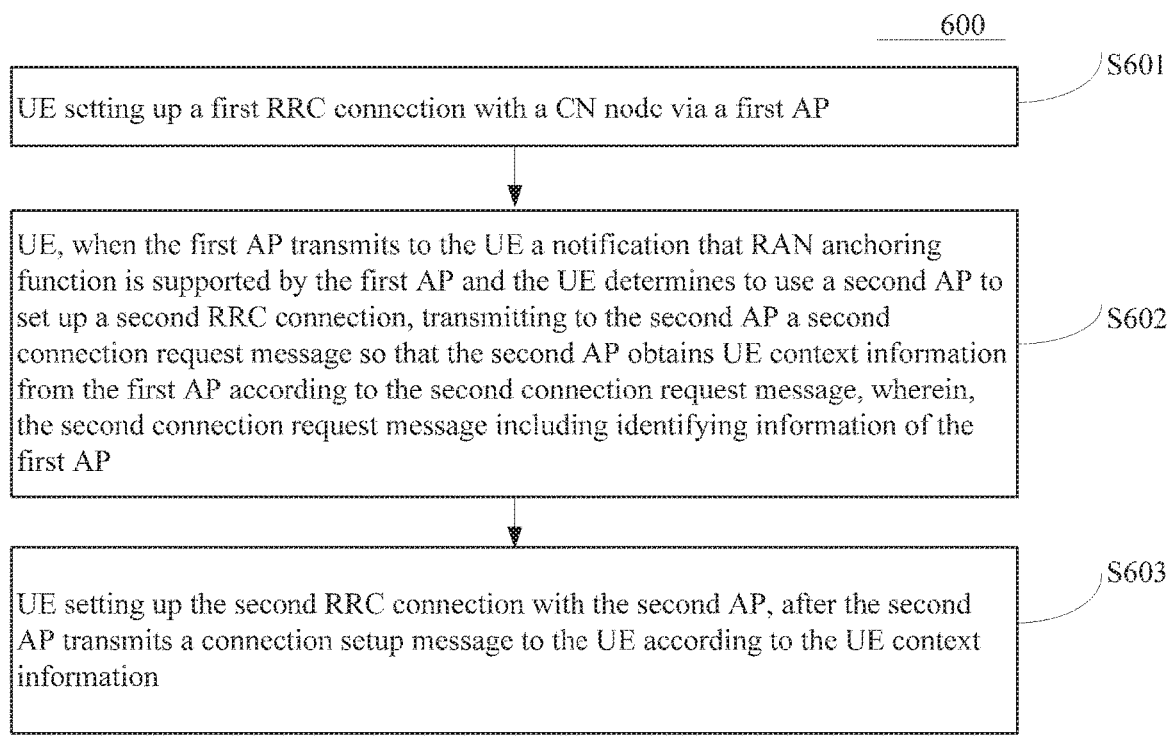
FIG. 6 illustrates a flowchart of a multi-connectivity establishment method for a user equipment (UE) according to an embodiment of the invention.

FIG. 6 illustrates a flowchart of a multi-connectivity establishment method for a UE according to an embodiment of the invention. As shown in FIG. 6, at S601, a UE sets up a first RRC connection with a CN node via a first AP. For example, a method as shown in FIG. 2 for establishing an RRC connection may be employed, so that the UE sets up the first RRC connection with the CN node.

At S602, when the first AP transmits to the UE a notification that RAN anchoring function is supported by the first AP and the UE determines to use a second AP to set up a second RRC connection, the UE transmits to the second AP a second connection request message so that the second AP obtains UE context information from the first AP according to the second connection request message, wherein, the second connection request message including identifying information of the first AP. For example, the UE context information may be obtained via an anchoring ACK message, which is transmitted to the second AP by the first AP according to the anchoring request message, as described in FIG. 3-5.

At S603, the second AP transmits a connection setup message to the UE according to the UE context information, and then the UE sets up the second RRC connection with the second AP. For another example, after the UE context information is obtained, the second AP may transmit a connection setup message to the UE according to the UE context information, and the UE may transmit a connection setup complete message to the second AP so as to set up the second RRC connection with the second AP according to the connection setup message.

According to an embodiment of the invention, after the two RRC connections with two APs (for example, AP1 and AP2 as shown in FIG. 3) have been established, the first AP will serve as anchoring device for multi-connectivity. That is to say, from UE perspective, data to be transmitted to a CN node through the first AP will be transmitted directly from the first AP, and data to be transmitted to a CN node through the second AP will be firstly transmitted from the second AP to the first AP, for example, via a X2 interface, and then transmitted to a CN node via the first AP, for example, via a S1 interface, thereby realizing multi-connectivity.

At this point, the procedure of establishment of connections between UE and two AN nodes has accomplished, but it should be noted that, the multi-connectivity establishment method in the present invention is not limited to the connections between one UE and two AN nodes. For example, according to the embodiments of the present invention, depending on implementations in practical, multi-connections to a CN node may be established between UE(s) and three or more APs via an AP serving as an anchoring device (for example, AP1 as described in FIG. 3-5 above).

According to an embodiment of the invention, after the RRC connection with an AP serving as an anchoring device is established, when the UE receives a notification that anchoring function is supported by the AP and the UE determines to establish RRC connections with other APs, the UE is able to establish multi-connections with other APs via the AP serving as an anchoring device, without performing S204-S210 as described in reference to FIG. 2, which could reduce the impact to CN for multi-connectivity.

In addition, the UE context information is obtained from an AP serving as an anchoring device during the multi-connectivity establishment, instead of from the CN side or from the UE side, which will not be a big burden for CN node and guarantees the safety of multi-connectivity at the same time.

According to another aspect of the present invention, a multi-connectivity establishment method for an AP is provided, and illustrative embodiments of the multi-connectivity establishment method will be described in reference to FIG. 7.

Figure 7:
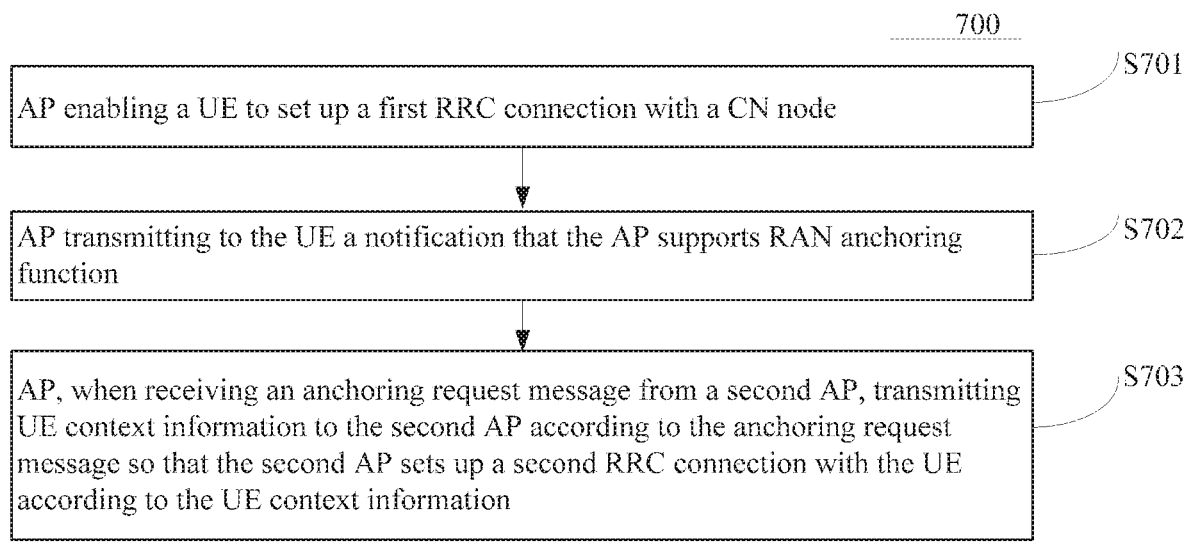
FIG. 7 illustrates a flowchart of a multi-connectivity establishment method for an access point (AP) according to an embodiment of the invention.

FIG. 7 illustrates a flowchart of a multi-connectivity establishment method for a UE according to an embodiment of the invention. As shown in FIG. 7, at S701, the AP enables a UE to set up a first RRC connection with a CN node. At S702, the AP transmits to the UE a notification that the AP supports RAN anchoring function. And at S703, the AP, when receiving an anchoring request message from a second AP, transmits UE context information to the second AP according to the anchoring request message so that the second AP sets up a second RRC connection with the UE according to the UE context information. For example, when the UE determines to use a second AP to set up the second RRC connection and transmits a second connection request message to the second AP, and then the second AP transmits the anchoring request message to the first AP according to the second connection request message, wherein, the second connection request message including identifying information of the first AP. According to an embodiment of the invention, after the RRC connection with an AP serving as an anchoring device is established, the AP is able to support the multi-connectivity establishment between UE and a CN node without performing S204-S210 for other APs as described in reference to FIG. 2, which could reduce the impact to CN for multi-connectivity.

According to another embodiment, when the first RRC connection with the AP is disconnected, the AP transmits the UE context information to the second AP. For example, when the first RRC connection with the AP is disconnected, i.e. the connection with the anchoring device is disconnected, similarly, as the interactions between the second AP and the first AP described in reference to FIG. 3-5, the second AP will serve as a new anchoring device, which enables establishment of other RRC connections to the CN node with other APs via the second AP.

In the embodiments above, the UE context information is obtained from an AP serving as an anchoring device during the multi-connectivity establishment, instead of from the CN side or from the UE side, which will not a big burden for CN node and guarantees the safety of multi-connectivity at the same time.

According to yet another aspect of the present invention, a multi-connectivity communication system is provided, and illustrative block diagram of a communication system according to an embodiment of the invention will be described in reference to FIG. 8.

Figure 8:
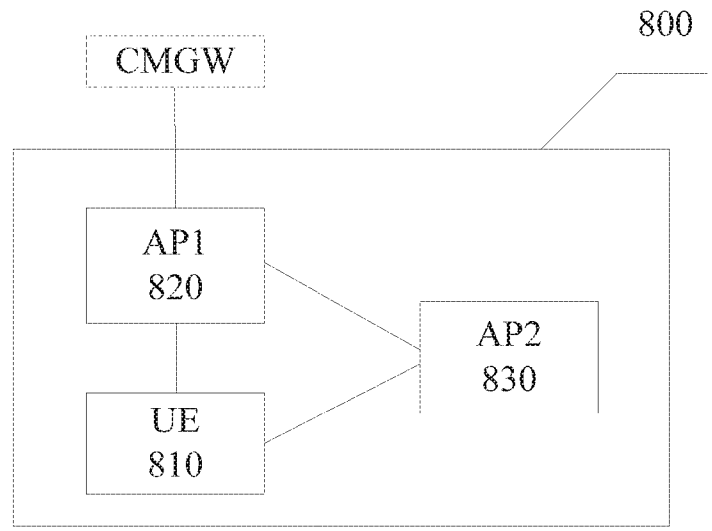
FIG. 8 illustrates a schematic block diagram of a communication system according to an embodiment of the invention.

As shown in FIG. 8, the communication system comprises: a UE 810, a first AP 820, and a second AP 830. The UE 810 maybe, for example, any kind of wireless device such as a mobile phone, a cellular phone, a Personal Digital Assistant (PDA), a smart phone, a tablet, a laptop computer, a handheld device having wireless connection capability, or other devices connected to a CN, etc. The first and second APs 820, 830 may be, for example, an AN node, such as an eNB.

In the communication system as shown in FIG. 8, the UE 810 sets up a first RRC connection with a CN node (for example, CMGW) via a first AP 820. For example, a method as shown in FIG. 2 for establishing an RRC connection may be employed, so that the UE 810 sets up the first RRC connection with the CN node. The first AP 820 transmits to the UE 810 a notification that RAN anchoring function is supported by the first AP 820. For example, the notification from the first AP 820 to the UE 810 may be transmitted via system information or dedicated RRC signaling procedure.

The second AP 830, when receiving a second connection request message transmitted from the UE 810 requesting for using the second AP 830 to set up a second RRC connection, transmits an anchoring request message to the first AP 820, wherein, the second connection setup message including identifying information of the first AP 820. For another example, the identifying information of the first AP 820 included in the second RRC connection request message may be either the global cell identifier for the first AP 820, or physical layer cell identity associated with a frequency, or a global eNB identity. Further, the second connection request message optionally includes identifying information of the UE 810 used in first AP 820, which may be, for example, C-RNTI, S-TMSI.

In addition, the first AP 820 transmits UE context information to the second AP 830 according to the anchoring request message, and the second AP 830 further sets up the second RRC connection with the UE 810 according to the UE context information.

At this point, the procedure of establishment of connections between UE 810 and two APs 820, 830 has accomplished, but it should be noted that, the multi-connectivity communication system in the present invention is not limited to the connections between one UE and two AN nodes. For example, according to the embodiments of the present invention, depending on implementations in practical, multi-connections to a CN node may be established between UE(s) 810 and three or more APs via an AP serving as an anchoring device (for example, AP1 820 as described in FIG. 8).

According to an embodiment of the invention, after the two RRC connections with two APs (for example, AP1 and AP2 as shown in FIG. 8) have been established, the first AP 820 will serve as anchoring device for multi-connectivity. That is to say, from UE perspective, data to be transmitted to a CN node (for example, CMGW as shown in FIG. 8) through the first AP 820 will be transmitted directly from the first AP 820, and data to be transmitted to a CN node through the second AP 830 will be firstly transmitted from the second AP 830 to the first AP 820, for example, via a X2 interface, and then transmitted to a CN node via the first AP 820, for example, via a S1 interface, thereby realizing multi-connectivity.

According to the embodiment of the invention, after the RRC connection with an AP serving as an anchoring device is established, when the UE receives a notification that anchoring function is supported by the AP and the UE determines to establish RRC connections with other APs, the UE is able to establish multi-connections with other APs via the AP (for example, AP1 as described in FIG. 8) serving as an anchoring device, without performing S204-S210 as described in reference to FIG. 2, which could reduce the impact to CN for multi-connectivity.

In addition, after the RRC connections between the UE and the two APs are established as described in reference to FIG. 8, there is possibility that the RRC connections are disconnected. A case where the second RRC connection with the second AP 830 is disconnected and a case where the first RRC connection with the first AP 820 is disconnected are similar as those described in the multi-connectivity establishment method for a communication system, and the descriptions will be omitted herein.

In the embodiments above, the UE context information is obtained from an AP serving as an anchoring device during the multi-connectivity establishment, instead of from the CN side or from the UE side, which will not a big burden for CN node and guarantees the safety of multi-connectivity at the same time.

According to another aspect of the present invention, a UE is provided, and illustrative block diagram of a UE according to an embodiment of the invention will be described in reference to FIG. 9.

Figure 9:
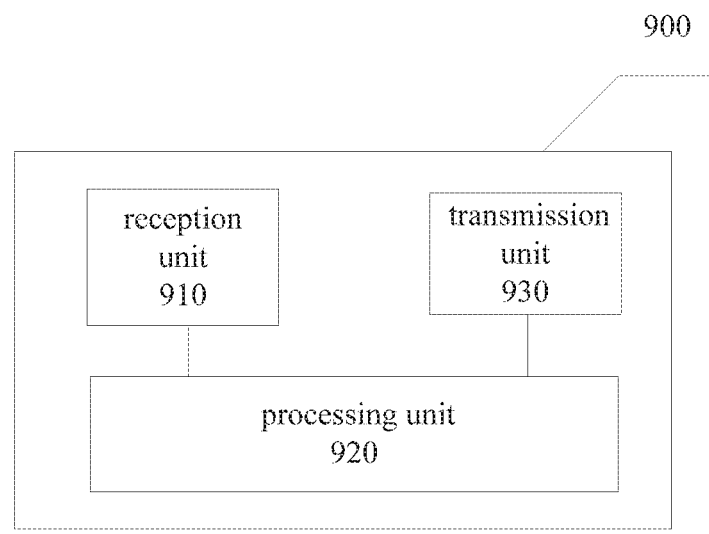
FIG. 9 illustrates a schematic block diagram of a UE according to an embodiment of the invention.

As shown in FIG. 9, the UE comprises: a reception unit 910, a processing unit 920, and a transmission unit 930. The UE 900 maybe, for example, any kind of wireless device such as a mobile phone, a cellular phone, a Personal Digital Assistant (PDA), a smart phone, a tablet, a laptop computer, a handheld device having wireless connection capability, or other devices connected to a CN, etc. In order to make the embodiment of the invention more clear and concise, only the parts of the UE which are more related to the invention are described, and other parts can be realized through the technical means known in the field. In the embodiment, the UE 900 has established a first RRC connection with a CN node via a first AP.

In the UE as shown in FIG. 9, the reception unit 910 receives from the first AP a notification that the first AP supports RAN anchoring function. The processing unit 920 determines whether to use a second AP to set up a second RRC connection. The transmission unit 930 transmits a second connection request message to the second AP when it determines to use the second AP to set up the second RRC connection, wherein the second connection request message including identifying information of the first AP.

In addition, the reception unit 910 further receives a connection setup message from the second AP, when the second AP obtains UE context information from the first AP according to the second connection request message. For example, the second AP transmits an anchoring request message to the first AP according to the second connection request message, and then the UE context information is obtained from the first AP by the second AP.

And the transmission unit 930 further, when the reception unit 910 receives the connection setup message from the second AP, transmits a connection complete message to the second AP.

According to an embodiment of the invention, after the two RRC connections with two APs (for example, AP1 and AP2 as shown in FIG. 8) have been established, the first AP will serve as anchoring device for multi-connectivity. That is to say, from UE perspective, data to be transmitted to a CN node through the first AP will be transmitted directly via the first AP, and data to be transmitted to a CN node through the second AP will be firstly transmitted from the second AP to the first AP, for example, via a X2 interface, and then transmitted to a CN node via the first AP, for example, via a S1 interface, thereby realizing multi-connectivity.

At this point, by way of reception unit 910, processing unit 920, and transmission unit 930, the procedure of establishment of connections between UE 900 and two APs has accomplished, but it should be noted that, the multi-connectivity communication system in the present invention is not limited to the connections between one UE and two AN nodes. For example, according to the embodiments of the present invention, depending on implementations in practical, multi-connections to a CN node may be established between UE(s) 810 and three or more APs via an AP serving as an anchoring device (for example, AP1 as described in FIG. 8).

According to the embodiment of the invention, after the RRC connection with an AP serving as an anchoring device is established, when a UE receives a notification that anchoring function is supported by the AP serving as an anchoring device (for example, AP1 as shown in FIG. 8) and the UE determines to establish RRC connections with other APs, the UE is able to establish multi-connections with other APs via the AP serving as an anchoring device, without performing S204-S210 as described in reference to FIG. 2, which could reduce the impact to CN for multi-connectivity.

In addition, the UE context information is obtained from an AP serving as an anchoring device during the multi-connectivity establishment, instead of from the CN side or from the UE side, which will not a big burden for CN node and guarantees the safety of multi-connectivity at the same time.

According to another aspect of the present invention, an AP is provided, and illustrative block diagram of an AP according to an embodiment of the invention will be described in reference to FIG. 10.

Figure 10:
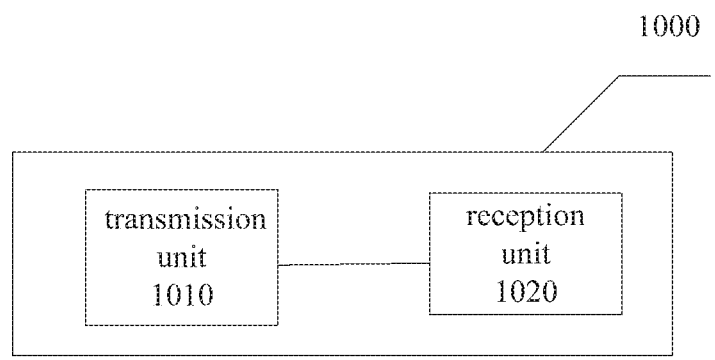
FIG. 10 illustrates a schematic block diagram of an AP according to an embodiment of the invention.

As shown in FIG. 10, the AP 1000 comprises: a transmission unit 1010 and a reception unit 1020. The AP may be, for example, an AN node, such as an eNB. In order to make the embodiment of the invention more clear and concise, only the parts of the UE which are more related to the invention are described, and other parts can be realized through the technical means known in the field. In the embodiment, the AP has enabled a UE to set up a first RRC connection with a CN node.

In the AP as shown in FIG. 10, the transmission unit 1010 transmits to the UE an notification that RAN anchoring function is supported by the AP 1000. The reception unit 1020, when the UE receives the notification and determines to use a second AP to set up a second RRC connection, receives an anchoring request message from the second AP. For example, when the UE receives the notification and determines to use a second AP to set up a second RRC connection, the UE transmits a second connection request message to the second AP, wherein, the second connection request message including identifying information of the first AP, thereby, the second AP transmits the anchoring request message to the AP.

The transmission unit 1010 further transmits UE context information to the second AP according to the anchoring request message so that the second AP sets up the second RRC connection with the UE according to the UE context information.

According to an embodiment of the invention, after the RRC connection with an AP serving as an anchoring device is established, the AP is able to support the multi-connectivity establishment between UE and a CN node without performing S204-S210 for other APs as described in reference to FIG. 2, which could reduce the impact to CN for multi-connectivity.

According to the embodiment of the invention, after the RRC connection with an AP serving as an anchoring device is established, the AP is able to support the multi-connectivity establishment between UE and CN node without performing S204-S210 as described in reference to FIG. 2, which could reduce the impact to CN for multi-connectivity.

According to another embodiment, the transmission unit 1010 further transmits the UE context information to the second AP, when the first RRC connection is disconnected. Similarly as the interactions between the second AP and the first AP described in reference to FIG. 8, the second AP will serve as a new anchoring device and enables UE establish other RRC connections to the CN node with other APs.

In the embodiments above, the UE context information is obtained from an AP serving as an anchoring device during the multi-connectivity establishment, instead of from the CN side or from the UE side, which will not a big burden for CN node and guarantees the safety of multi-connectivity at the same time.

Although the multi-connectivity establishment method, communication system, user equipment and access point are described in combination with the embodiments in 5G network, however, for those skilled in the art, the methods can be used in other communication systems without paying creative work, such as LTE, LTE-Advanced, Wideband Code-Division Multiple Access (WCDMA), Global System for Mobile communications/Enhanced Data rate for GSM Evolution (GSM/EDGE), or GSM network, or other network or system. Therefore, the methods, communication system, user equipment and access point are not limited to 5G network.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A multi-connectivity establishment method for a communication system, said method comprising:
   a user equipment (UE) setting up a first radio resource control (RRC) connection with a core network (CN) node via a first access point (AP);
   the UE, when the first AP transmits to the UE a notification that radio access network (RAN) anchoring function is supported by the first AP and the UE determines to use a second AP to set up a second RRC connection, entering a dual connectivity mode from a single connectivity mode by transmitting a second connection request message to the second AP, wherein, the second connection request message includes identifying information of the first AP; and
   the second AP, according to the second connection request message, transmitting an anchoring request message to the first AP so as to obtain UE context information, and setting up the second RRC connection with the UE according to the UE context information.

2. The multi-connectivity establishment method as claimed in claim 1 wherein, the notification from the first AP to the UE may be via system information or dedicated RRC signaling procedure.

3. The multi-connectivity establishment method as claimed in claim 1, wherein the identifying information in the second RRC connection request message may be either the global cell identifier for the first AP, or physical layer cell identity associated with a frequency, or a global eNB identity.

4. The multi-connectivity establishment method as claimed in claim 1, wherein the second AP obtaining UE context information comprises:
   the first AP, according to the anchoring request message, transmitting an anchoring acknowledgement (ACK) message to the second AP, wherein, the anchoring ACK message includes the UE context information.

5. The multi-connectivity establishment method as claimed in claim 1, wherein the second AP setting up the second RRC connection with the UE comprises:
   the second AP, according to the UE context information, transmitting a connection setup message to the UE; and
   the UE, according to the connection setup message, transmitting a connection setup complete message to the second AP so as to set up the second RRC connection with the second AP.

6. The multi-connectivity establishment method as claimed in claim 1, further comprising: the UE, when the second RRC connection is disconnected and the UE determines to use a third AP to set up a third RRC connection, transmitting a third connection request message to the third AP, wherein the third connection request message includes identifying information of the first AP; and
   the third AP, according to the third connection request message, transmitting an anchoring request message to the first AP so as to obtain the UE context information, and setting up the third RRC connection with the UE according to the UE context information.

7. The multi-connectivity establishment method as claimed in claim 1, further comprising: the first AP, when the first RRC connection is disconnected, transmitting the UE context information to the second AP; and
   the second AP, when receiving the UE context information, transmitting to the UE a notification that the second AP is serving as a new anchor point.

8. The multi-connectivity establishment method as claimed in claim 7, further comprising:
   the UE, when receiving the notification that the second AP is serving as a new anchor point and determining to use a fourth AP to setup a fourth RRC connection, transmitting a fourth connection setup message to the fourth AP, wherein the fourth connection request message includes identifying information of the second AP; and
   the fourth AP, according to the fourth connection request message, transmitting an anchoring request message to the second AP so as to obtain the UE context information, and setting up the fourth RRC connection with the UE according to the UE context information.

9. A multi-connectivity establishment method for a user equipment (UE), said method comprising:
   the UE setting up a first radio resource control (RRC) connection with a core network (CN) node via a first access point (AP);
   the UE, when the UE receives from the first AP a notification that radio access network (RAN) anchoring function is supported by the first AP and the UE determines to use a second AP to set up a second RRC connection, entering a dual connectivity mode from a single connectivity mode by transmitting to the second AP a second connection request message so that the second AP obtains UE context information from the first AP according to the second connection request message, wherein the second connection request message includes identifying information of the first AP; and the UE setting up the second RRC connection with the second AP, after the UE receives a connection setup message from the second AP according to the UE context information.

10. A multi-connectivity establishment method for an access point (AP), said method comprising:

the AP enabling a user equipment (UE) to set up a first radio resource control (RRC) connection with a core network (CN) node;

the AP transmitting to the UE a notification that the AP supports radio access network (RAN) anchoring function;

the AP, when receiving an anchoring request message from a second AP, transmitting UE context information to the second AP according to the anchoring request message so that the second AP sets up a second RRC connection with the UE to enter a dual connectivity mode from a single connectivity mode according to the UE context information.

11. The multi-connectivity establishment method as claimed in claim 10, wherein the AP, when the first RRC connection is disconnected, transmitting the UE context information to the second AP.

12. A multi-connectivity communication system, comprising:

a user equipment (UE) configured to set up a first radio resource control (RRC) connection with a core network (CN) node via a first access point (AP);

the first AP configured to transmit to the UE a notification that radio access network (RAN) anchoring function is supported by the first AP;

a second AP configured to, when receiving a second connection request message transmitted from the UE requesting for using the second AP to set up a second RRC connection, transmit an anchoring request message to the first AP, wherein the second connection setup message includes identifying information of the first AP, wherein the first AP is further configured to transmit UE context information to the second AP, according to the anchoring request message, and wherein the second AP is further configured to set up the second RRC connection with the UE to enter a dual connectivity mode from a single connectivity mode according to the UE context information.

13. A user equipment (UE), wherein the UE has set up a first radio resource control (RRC) connection with a core network (CN) node via a first access point (AP), the UE comprising:

a reception unit configured to receive from the first AP a notification that the first AP supports radio access network (RAN) anchoring function;

a processing unit configured to determine whether to use a second AP to enter a dual connectivity mode from a single connectivity mode by setting up a second RRC connection;

a transmission unit configured to transmit a second connection request message to the second AP when it determines to use the second AP to set up the second RRC connection, wherein the second connection request message includes identifying information of the first AP;

the reception unit further configured to, when the second AP obtains UE context information from the first AP according to the second connection request message, receive a connection setup message from the second AP, and the transmission unit further configured to, when the reception unit receives the connection setup message from the second AP, transmit a connection complete message to the second AP.

14. An access point (AP), wherein the AP is configured to enable a user equipment (UE) to set up a first radio resource control (RRC) connection with a core network (CN) node, the AP comprising:

a transmission unit configured to transmit to the UE a notification that radio access network (RAN) anchoring function is supported by the AP;

a reception unit configured to, when the UE receives the notification and determines to use a second AP to set up a second RRC connection, receive an anchoring request message from the second AP, and the transmission unit further configured to transmit UE context information to the second AP according to the anchoring request message so that the second AP sets up the second RRC connection with the UE to enter a dual connectivity mode from a single connectivity mode according to the UE context information.

15. The AP as claimed in claim 14, wherein the transmission unit is further configured to transmit the UE context information to the second AP when the first RRC connection is disconnected.

* * * * *